(12) United States Patent
Yamamoto et al.

(10) Patent No.: US 12,247,621 B2
(45) Date of Patent: Mar. 11, 2025

(54) WHEEL BEARING DEVICE

(71) Applicant: NTN CORPORATION, Osaka (JP)

(72) Inventors: Kazunari Yamamoto, Iwata (JP); Hayato Taniguchi, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/872,589

(22) Filed: Jul. 25, 2022

(65) Prior Publication Data

US 2023/0003256 A1 Jan. 5, 2023

Related U.S. Application Data

(63) Continuation-in-part of application No. 16/758,204, filed as application No. PCT/JP2018/039558 on Oct. 24, 2018, now Pat. No. 11,506,241.

(30) Foreign Application Priority Data

Oct. 24, 2017 (JP) .................................. 2017-205646

(51) Int. Cl.
*F16C 33/58* (2006.01)
*F16C 33/64* (2006.01)

(52) U.S. Cl.
CPC ............ *F16C 33/583* (2013.01); *F16C 33/64* (2013.01); *F16C 2326/02* (2013.01)

(58) Field of Classification Search
CPC ............ B23D 43/02; F16C 33/64; C21D 9/32
See application file for complete search history.

(56) References Cited

U.S. PATENT DOCUMENTS

| 1,197,132 | A | * | 9/1916 | Lapointe | ................ | B23D 43/02 407/18 |
| 1,744,217 | A | * | 1/1930 | Forberg | ................. | B23D 43/02 407/15 |
| 1,935,774 | A | * | 11/1933 | Halborg | ................. | B23D 43/02 407/18 |

(Continued)

FOREIGN PATENT DOCUMENTS

| DE | 102011002019 A1 | * 10/2012 | ............... C21D 7/02 |
| EP | 2 113 394 | 11/2009 | |

(Continued)

OTHER PUBLICATIONS

JP-5768969-B2 machine translation (Year: 2015).*

(Continued)

*Primary Examiner* — Michael W Hotchkiss
(74) *Attorney, Agent, or Firm* — Wenderoth, Lind & Ponack, L.L.P.

(57) ABSTRACT

A wheel bearing device (1) including: an outer member (2) on the inner periphery of which an outer-side rolling surface (2*c*/2*d*) is formed; an inner member (3) on the outer periphery of which an inner-side rolling surface (3*c*/3*d*) is formed; and a plurality of rolling bodies (41) interposed between the rolling surfaces (2*c*/2*d*/3*c*/3*d*) of the outer member (2) and the inner member (3). The wheel bearing device having a spline hole (3*b*) formed in a through hole (3*h*) of the inner member (3). The spline hole includes a guide groove (3G) formed on an inner circumferential surface thereof. A guide plate (8G) of a finishing broach (8) passes through the guide groove in the inner periphery of the spline hole (3*b*).

3 Claims, 13 Drawing Sheets

(56) References Cited

U.S. PATENT DOCUMENTS

| | | | | |
|---|---|---|---|---|
| 3,276,099 A * | 10/1966 | Psenka | B23F 21/26 | |
| | | | 407/18 | |
| 3,762,006 A * | 10/1973 | Tersch | B23D 43/06 | |
| | | | 407/14 | |
| 4,012,829 A * | 3/1977 | Dvorov | B23D 43/02 | |
| | | | 29/90.01 | |
| 4,808,779 A * | 2/1989 | Cogley | H05B 6/405 | |
| | | | 219/652 | |
| 4,894,501 A * | 1/1990 | Pfaffmann | C21D 1/10 | |
| | | | 219/661 | |
| 5,768,969 A * | 6/1998 | Dalfiume | B41F 13/54 | |
| | | | 83/660 | |
| 5,771,737 A | 6/1998 | Yaegashi | | |
| 5,919,094 A | 7/1999 | Yaegashi | | |
| 5,975,271 A * | 11/1999 | Iwata | F16D 13/644 | |
| | | | 403/359.6 | |
| 7,021,874 B2 * | 4/2006 | Shimasaku | B23D 37/10 | |
| | | | 409/281 | |
| 8,061,936 B2 | 11/2011 | Allen | | |
| 8,360,655 B2 | 1/2013 | Ozawa et al. | | |
| 8,777,492 B2 | 7/2014 | Yamamoto et al. | | |
| 9,511,629 B2 * | 12/2016 | Torii | F16D 1/104 | |
| 10,207,536 B2 | 2/2019 | Song et al. | | |
| 2004/0120622 A1 * | 6/2004 | Tajima | F16D 1/0858 | |
| | | | 384/544 | |
| 2004/0158988 A1 * | 8/2004 | Ozawa | F16C 19/186 | |
| | | | 29/898.061 | |
| 2005/0172744 A1 * | 8/2005 | Koyama | C21D 9/32 | |
| | | | 74/425 | |
| 2005/0277479 A1 * | 12/2005 | Ichikawa | F16C 3/02 | |
| | | | 464/179 | |
| 2007/0246135 A1 * | 10/2007 | Pollard | C21D 1/10 | |
| | | | 148/579 | |
| 2009/0301608 A1 * | 12/2009 | Taniguchi | C22C 38/001 | |
| | | | 148/319 | |
| 2010/0196106 A1 * | 8/2010 | Allen | B23F 1/08 | |
| | | | 407/14 | |
| 2010/0220946 A1 * | 9/2010 | Ozawa | F16D 1/10 | |
| | | | 384/456 | |
| 2012/0160832 A1 * | 6/2012 | Takayama | C21D 9/32 | |
| | | | 219/640 | |
| 2013/0076111 A1 * | 3/2013 | Yamamoto | F16C 35/067 | |
| | | | 301/109 | |
| 2015/0059930 A1 * | 3/2015 | Aitcin | C23C 8/80 | |
| | | | 148/206 | |
| 2016/0298203 A1 * | 10/2016 | Hackel | C21D 9/32 | |
| 2017/0043617 A1 * | 2/2017 | Song | B60B 35/18 | |
| 2019/0264745 A1 * | 8/2019 | Hiramatsu | F16C 19/18 | |

FOREIGN PATENT DOCUMENTS

| | | | |
|---|---|---|---|
| EP | 2505684 B1 * | 5/2018 | C21D 1/06 |
| JP | 2-107826 | 8/1990 | |
| JP | 03-204417 | 9/1991 | |
| JP | 08-135647 | 5/1996 | |
| JP | 09-272013 | 10/1997 | |
| JP | 2004-314248 | 11/2004 | |
| JP | 2008-207586 | 9/2008 | |
| JP | 2009-097628 | 5/2009 | |
| JP | 2011-240755 | 12/2011 | |
| JP | 2013-018085 | 1/2013 | |
| JP | 2014020404 A * | 2/2014 | F16C 35/063 |
| JP | 5768969 | 8/2015 | |
| JP | 5768969 B2 * | 8/2015 | |
| JP | 2017-047716 | 3/2017 | |
| JP | 2017-517441 | 6/2017 | |
| WO | WO-2005017393 A1 * | 2/2005 | B62D 5/0409 |
| WO | 2007/092775 | 8/2007 | |
| WO | WO-2007092775 A2 * | 8/2007 | B23D 43/02 |

OTHER PUBLICATIONS

JP-2014020404-A translation of the description (Year: 2014).*
WO-2005017393-A1 translation of the description (Year: 2005).*
DE-102011002019-A1 Translation (Year: 2012).*
International Search Report issued Jan. 22, 2019 in International (PCT) Application No. PCT/JP2018/039558.
Partial English Translation of JPH02-107826.
Office Action issued Jan. 20, 2023 in corresponding Chinese Patent Application No. 201880069467.8, with English translation.

* cited by examiner

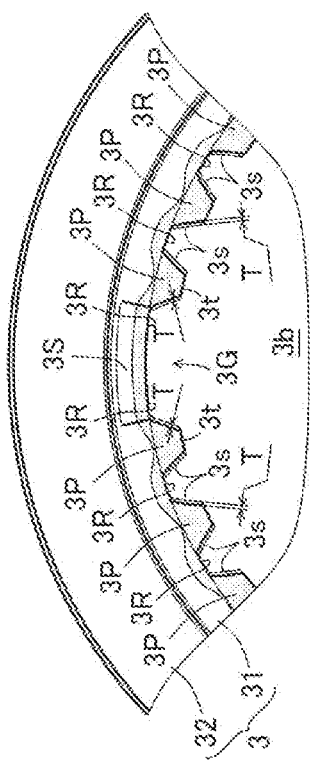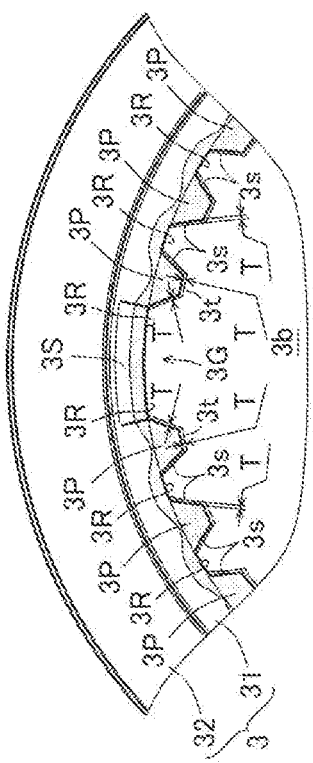
FIG. 9(A)
FIG. 9(B)

WHEEL BEARING DEVICE

TECHNICAL FIELD

The present invention relates to a wheel bearing device and a method for manufacturing said device.

BACKGROUND ART

Conventionally, there is known a wheel bearing device that rotatably supports a wheel (for example, see Patent Literature 1 and Patent Literature 2). The wheel bearing device includes an outer member fixed to a vehicle body. Further, at an inner side of the outer member, an inner member is disposed. The outer member and the inner member each have a raceway face. Between the raceway faces, a plurality of rolling elements are interposed. With this configuration, the wheel bearing device forms a rolling bearing structure, and rotatably supports the wheel that is attached to the inner member.

Patent Literature 1 discloses a wheel bearing device that includes an inner member including a spline hole, and a universal joint including a spline shaft; and the spline shaft is fitted into the spline hole. In the wheel bearing device, the spline hole has, on its surface, an uneven shape that is formed parallel to an axial direction. Thus, when an uneven shape of the spline shaft is circumferentially twisted, a twisting load is applied to the uneven shape of each of the spline hole and the spline shaft. As a result, circumferential looseness is reduced. With such a fitted structure, the spline shaft needs to have, at its tip, a bolt or the like attached. When the spline shaft is inserted into the spline hole, the bolt or the like attached needs to be turned to further pull the spline shaft into the spline hole.

On the other hand, Patent Literature 2 discloses a wheel bearing device including a spline shaft, a tip of which has no bolt or the like attached, and the spline shaft is thus not pulled into the spline hole. With the wheel bearing device in this state, the spline shaft, too, needs to have its uneven shape formed parallel to an axial direction, and a certain degree of circumferential looseness needs to be allowed. With such a fitted structure, heat treatment is provided to each of the spline hole and the spline shaft. As a result, the uneven shape of the corresponding spline hole and the corresponding spline shaft are less prone to be worn or damaged.

When the heat treatment is provided to the spline hole, the uneven shape of the spline hole is deformed, degrading initial machining accuracy. Thus, a countermeasure considered is to run a broach through the spline hole again after the heat treatment, and the uneven shape of the spline hole is finished at high accuracy. However, matching a phase of the broach to the uneven shape of the spline hole is difficult; and in an unmatched state, running the broach through the spline hole may hinder the spline hole from securing an appropriate cutting allowance and being finished at high accuracy. Further, a broached surface may be roughened, and the broach may be overloaded and reduced in service life.

CITATIONS LIST

Patent Literature

Patent Literature 1: JP-A 2017-47716 Gazette
Patent Literature 2: JP-A 2011-240755 Gazette

SUMMARY OF INVENTION

Technical Problems

The present invention provides a technique to easily match the phase of the broach to the uneven shape of the spline hole, and to finish the uneven shape of the spline hole at high accuracy by securing the appropriate cutting allowance. Further, the present invention provides a technique to protect the broached surface from being roughened, and to prevent the broach from being overloaded and reduced in service life.

Solutions to Problems

A first aspect of the present invention provides a wheel bearing device including:
  an outer member having an outer raceway face that is formed on an inner circumference of the outer member;
  an inner member having an inner raceway face that is formed on an outer circumference of the inner member; and
  a plurality of rolling elements that are interposed between the outer raceway face of the outer member and the inner raceway face of the inner member.
The wheel bearing device further includes a spline hole that is formed in a through hole of the inner member.
In the wheel bearing device, the spline hole includes a guide groove that is formed on an inner circumference of the spline hole, the guide groove through which a guide plate of a finishing broach is to be run.

In a second aspect of the present invention, the wheel bearing device according to the first aspect of the present invention is configured in that the guide groove is formed of a plurality of recesses that are adjacent to each other and are circumferentially connected to each other, the plurality of recesses as a part of recesses that form the uneven shape.

In a third aspect of the present invention, the wheel bearing device according to the first aspect or the second aspect of the present invention is configured in that the inner member includes a phase matching portion that is formed on an inner-side end face of the inner member and recessed at an outer side of the inner member, and
  the phase matching portion is formed in a shape where an inner-side opening end of the guide groove spreads radially outward.

In a fourth aspect of the present invention, the wheel bearing device according to any one of the first aspect to the third aspect of the present invention is configured in that
  the guide plate includes a cross-sectional face formed to be inclined toward a side face of the guide groove, and as the guide plate goes into the guide groove, a gap between the cross-sectional face of the guide plate and the side face of the guide groove is gradually reduced.

A fifth aspect of the present invention provides a method for manufacturing a wheel bearing device,
  the wheel bearing device including:
  an outer member having an outer raceway face that is formed on an inner circumference of the outer member;
  an inner member having an inner raceway face that is formed on an outer circumference of the inner member; and
  a plurality of rolling elements that are interposed between the outer raceway face of the outer member and the inner raceway face of the inner member.

The method for manufacturing the wheel bearing device includes:
- a forming step of forming a spline hole by running a forming broach through a through hole of the inner member;
- a heat treatment step of providing a heat treatment to the outer raceway face, the inner raceway face, and the spline hole; and
- a finishing step of finishing an uneven shape of the spline hole at high accuracy by running a finishing broach through the spline hole after the heat treatment step.

In a sixth aspect of the present invention, the method for manufacturing the wheel bearing device according to the fifth aspect of the present invention is configured in that the finishing step includes a step of fitting a guide plate of the finishing broach into a guide groove that is formed on an inner circumference of the spline hole.

Advantageous Effects of Invention

In a wheel bearing device according to the first aspect of the present invention, a guide groove is formed on an inner circumference of a spline hole, and a guide plate of a finishing broach is to be run through the guide groove. In the wheel bearing device, a phase of the finishing broach is easily matched to an uneven shape of the spline hole. Additionally, it is possible to finish the uneven shape of the spline hole at high accuracy by securing an appropriate cutting allowance. Further, it is possible to protect a broached surface from being roughened, and to prevent the finishing broach from being overloaded and reduced in service life.

In a wheel bearing device according to the second aspect of the present invention, the guide groove is formed of a plurality of recesses that are adjacent to each other and are circumferentially connected to each other. The plurality of recesses are a part of recesses that form the uneven shape. In the wheel bearing device, when the spline hole is formed by running a forming broach, the guide groove is concurrently formed. This configuration simplifies a step of manufacturing the wheel bearing device. As a result, it is possible to suppress an increase of cost.

In a wheel bearing device according to the third aspect of the present invention, a phase matching portion is formed in a shape where an inner-side opening end of the guide groove spreads radially outward. In the wheel bearing device, an operator grasps a position of the guide groove at a glance, and thus a step of fitting the guide plate of the finishing broach into the guide groove is easily performed.

In a wheel bearing device according to the fourth aspect of the present invention, the guide plate includes a cross-sectional face formed to be inclined toward a side face of the guide groove. With this configuration, as the guide plate goes into the guide groove, a gap between the cross-sectional face of the guide plate and the side face of the guide groove is gradually reduced. In the wheel bearing device, the guide plate goes into the guide groove in accordance with an inclination of the cross-sectional face, and the phase of the finishing broach is thereby tuned.

In a method for manufacturing a wheel bearing device according to the fifth aspect of the present invention, a finishing step is included. The finishing step is a step of, after providing a heat treatment to a spline hole, running a finishing broach through the spline hole. In the method for manufacturing the wheel bearing device, it is possible to finish an uneven shape of the spline hole at high accuracy.

In a method for manufacturing the wheel bearing device according to the sixth aspect of the present invention, the finishing step includes a step of fitting a guide plate of the finishing broach into a guide groove that is formed on an inner circumference of the spline hole. In the method for manufacturing the wheel bearing device, a phase of the finishing broach is easily matched to the uneven shape of the spline hole. Additionally, it is possible to finish the uneven shape of the spline hole at high accuracy by securing an appropriate cutting allowance. Further, it is possible to protect a broached surface from being roughened, and to prevent the finishing broach from being overloaded and reduced in service life.

BRIEF DESCRIPTION OF DRAWINGS

FIG. 9(A) illustrates a cutting allowance including a side face to be removed by a finishing broach.
FIG. 9(B) illustrates a cutting allowance including a side face and an upper face to be removed by a finishing broach.

DESCRIPTION OF EMBODIMENTS

Figure 1:
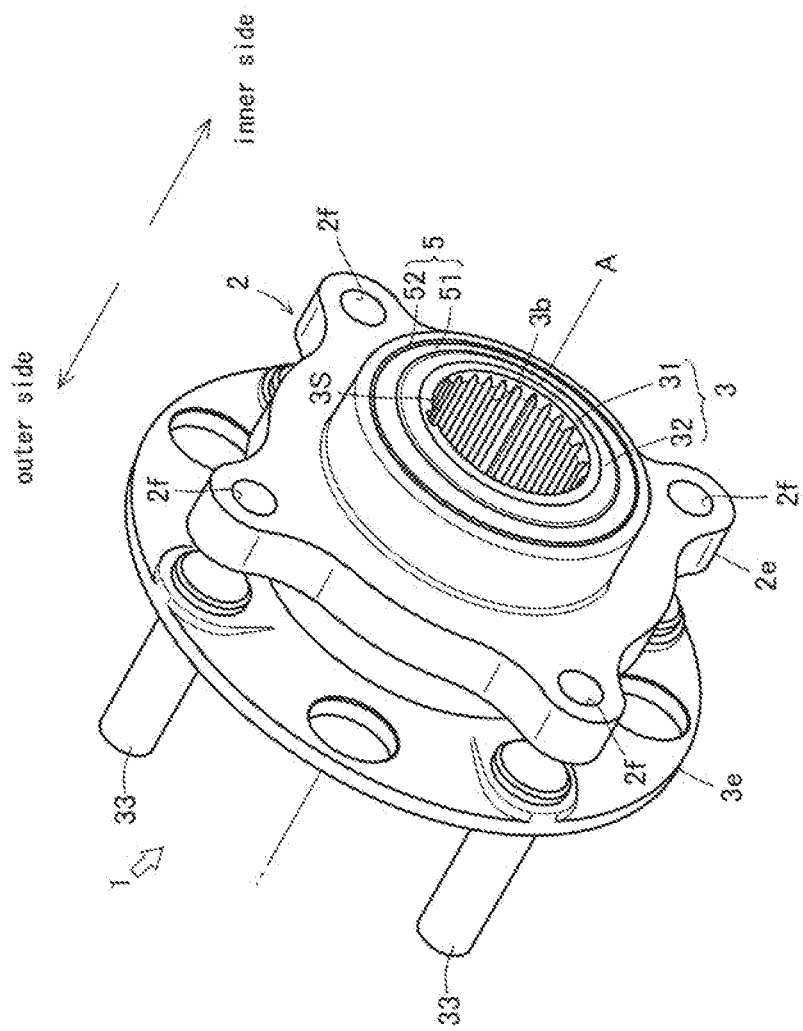
FIG. 1 illustrates a wheel bearing device.
Figure 2:
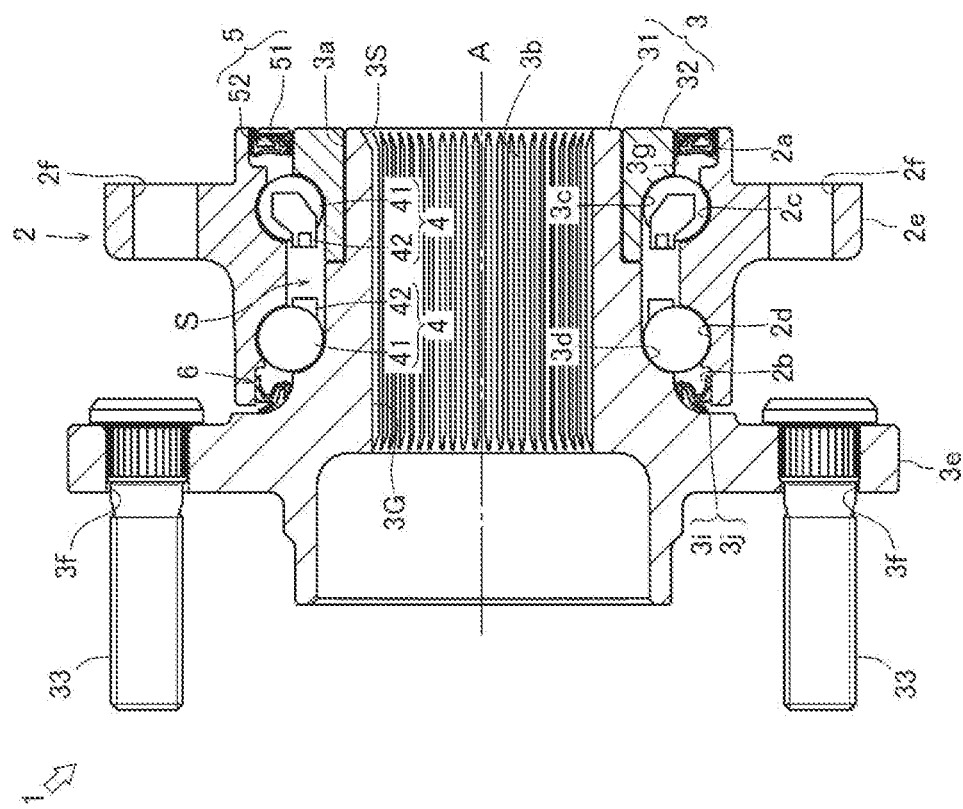
FIG. 2 illustrates a configuration of the wheel bearing device.
Figure 3:
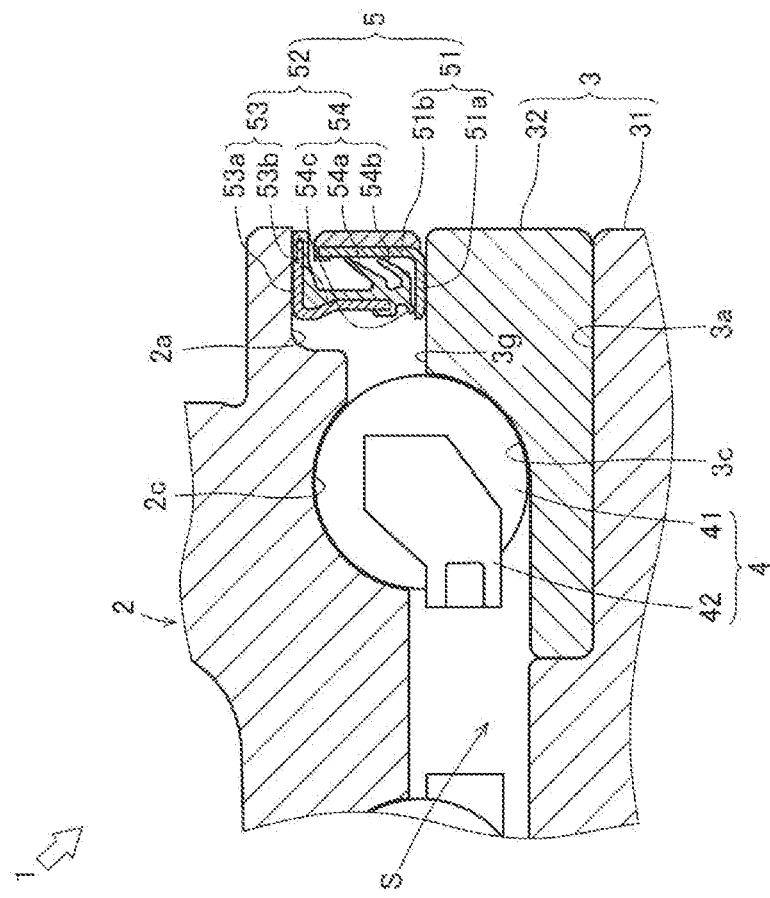
FIG. 3 illustrates a part of the configuration of the wheel bearing device.
Figure 4:
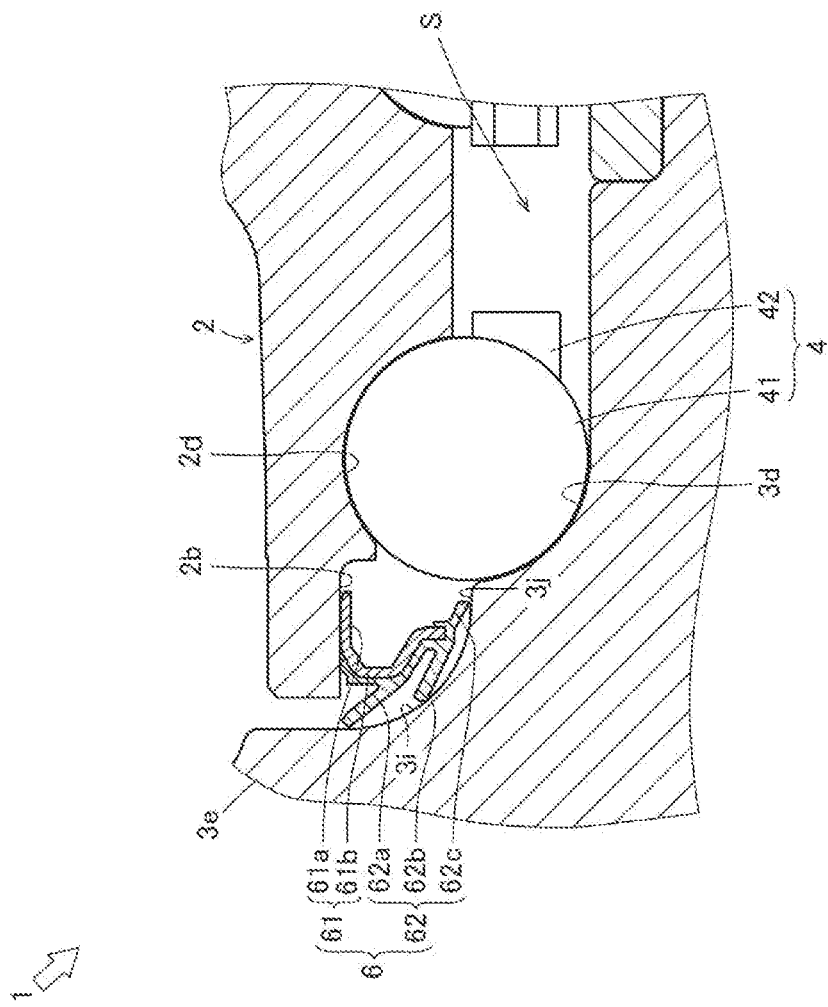
FIG. 4 illustrates a part of the configuration of the wheel bearing device.

First, a wheel bearing device 1 according to the present invention will be described. FIG. 1 illustrates the wheel bearing device 1. FIG. 2 illustrates a configuration of the wheel bearing device 1. FIGS. 3 and 4 each illustrate a part of the configuration of the wheel bearing device 1.

The wheel bearing device 1 rotatably supports a wheel. The wheel bearing device 1 includes an outer member 2, an inner member 3, and two rolling element rows 4. In this description, an "inner side" represents a vehicle body side of the wheel bearing device 1 when attached to a vehicle body, and an "outer side" represents a wheel side of the wheel bearing device 1 when attached to the vehicle body. Additionally, "radially outward" represents a direction away from a rotational axis A of the inner member 3, and "radially inward" represents a direction closer to the rotational axis A of the inner member 3. Further, "an axial direction/axially" represents a direction along the rotational axis A of the inner member 3.

The outer member 2 forms an outer race part of a rolling bearing structure. The outer member 2 includes, on an inner circumference of its inner-side end, a fitting face 2a. The outer member 2 also includes, on an inner circumference of its outer-side end, a fitting face 2b. The fitting face 2a and the fitting face 2b are adjacent to an outer raceway face 2c and an outer raceway face 2d, respectively, on the inner circumference of the outer member 2. The outer raceway face 2c opposes an inner raceway face 3c as will be described later. The outer raceway face 2d opposes an inner raceway face 3d as will be described later. The outer member 2 further include a knuckle flange 2e that extends radially outward. The knuckle flange 2e includes a plurality of bolt holes 2f.

The inner member 3 forms an inner race part of the rolling bearing structure. The inner member 3 includes a hub race 31 and an inner race 32.

The hub race 31 includes, from its inner-side end to its axially center portion, a small-diameter stepped portion 3a. The small-diameter stepped portion 3a indicates a portion where an outer diameter of the hub race 31 is reduced, and an outer circumferential face of the small-diameter stepped portion 3a has a cylindrical shape formed around the rotational axis A. The hub race 31 also includes a spline hole 3b that penetrates from an inner-side end to an outer-side end of the hub race 31. The spline hole 3b is provided at a center of the hub race 31 and has, on its surface, an uneven shape that is formed parallel to the axial direction. The hub race 31 further includes, on its outer circumference, an inner raceway face 3d. In a state where the hub race 31 is disposed at an inner side of the outer member 2, the inner raceway face 3d opposes the outer raceway face 2d as previously described. The hub race 31 further includes a hub flange 3e that extends radially outward. The hub flange 3e includes a plurality of bolt holes 3f, in each of which a hub bolt 33 is press-fitted.

The inner race 32 includes, on an outer circumference of its inner-side end, a fitting face 3g. The inner race 32 also includes, on its outer circumference and adjacent to the fitting face 3g, the inner raceway face 3c. The inner race 32 is fitted to the small-diameter stepped portion 3a of the hub race 31 to form the inner raceway face 3c on the outer circumference of the hub race 31. In a state where the inner race 32 is combined with the hub race 31 and disposed at the inner side of the outer member 2, the inner raceway face 3c opposes the outer raceway face 2c as previously described.

The rolling element row 4 forms a rolling part of the rolling bearing structure. The rolling element row 4 at the inner side includes a plurality of rolling elements 41 and a retainer 42. Similarly, the rolling element row 4 at the outer side includes a plurality of rolling elements 41 and a retainer 42.

The rolling elements 41 are each held in a circular shape and evenly spaced by the retainer 42. The rolling elements 41 included in the rolling element row 4 at the inner side are rollably interposed between the outer raceway face 2c of the outer member 2 and the inner raceway face 3c of the inner member 3 (inner race 32). The rolling elements 41 included in the rolling element row 4 at the outer side are rollably interposed between the outer raceway face 2d of the outer member 2 and the inner raceway face 3d of the inner member 3 (hub race 31).

The retainer 42 has an annular shape and includes hollows, each evenly spaced from the other hollow and configured to house the rolling element 41. The retainer 42 includes spherical walls, each of which extends between the rolling elements 41 adjoining each other. Two of the spherical walls sandwich each of the rolling elements 41 therebetween to hold the corresponding rolling element 41. With this configuration, the retainer 42 restricts each of the rolling elements 41 from deviating (moving out of position) circumferentially and radially.

The wheel bearing device 1 according to this application further includes an inner-side seal member 5 and an outer-side seal member 6 in order to seal an annular space S formed between the outer member 2 and the inner member 3 (the hub race 31 and the inner race 32). Note that, the inner-side seal member 5 and the outer-side seal member 6 have various specifications and are not limited to the specifications disclosed in this description.

The inner-side seal member 5 includes a slinger 51 and a seal ring 52. The slinger 51 has its axial cross section portion bent into a substantial L-shape to form a fitting portion 51a of a cylindrical shape and a side plate portion 51b of a disk shape, the side plate portion 51b extending radially outward. Then, the fitting portion 51a is fitted to the fitting face 3g of the inner member 3 (the inner race 32). On the other hand, the seal ring 52 is formed of an elastic member 54, and a core bar 53 to which the elastic member 54 is bonded. The core bar 53 has its axial cross section portion bent into a substantial L-shape to form a fitting portion 53a of a cylindrical shape and a side plate portion 53b of a disk shape, the side plate portion 53b extending radially inward. Then, the fitting portion 53a is fitted to the fitting face 2a of the outer member 2. The elastic member 54 includes two dust lips 54a and 54b, each having a tip edge in contact with the side plate portion 51b of the slinger 51 that is disposed opposite the two dust lips 54a and 54b. The elastic member 54 further includes a grease lip 54c having a tip edge in contact with or in proximity of the fitting portion 51a of the slinger 51 that is disposed opposite the grease lip 54c.

The outer-side seal member 6 is formed of an elastic member 62, and a core bar 61 to which the elastic member 62 is bonded. The core bar 61 has its axial cross section portion bent into a substantial L-shape to form a fitting portion 61a of a cylindrical shape and a side plate portion 61b of a disk shape, the side plate portion 61b extending radially inward. Then, the fitting portion 61a is fitted to the fitting face 2b of the outer member 2. The elastic member 62 includes two dust lips 62a and 62b, each having a tip edge in contact with a circular-arc face 3i that is connected to the hub flange 3e. The elastic member 62 further includes a grease lip 62c having a tip edge in contact with or in proximity of a shaft circumferential face 3j that is connected to the circular-arc face 3i.

Figure 5:
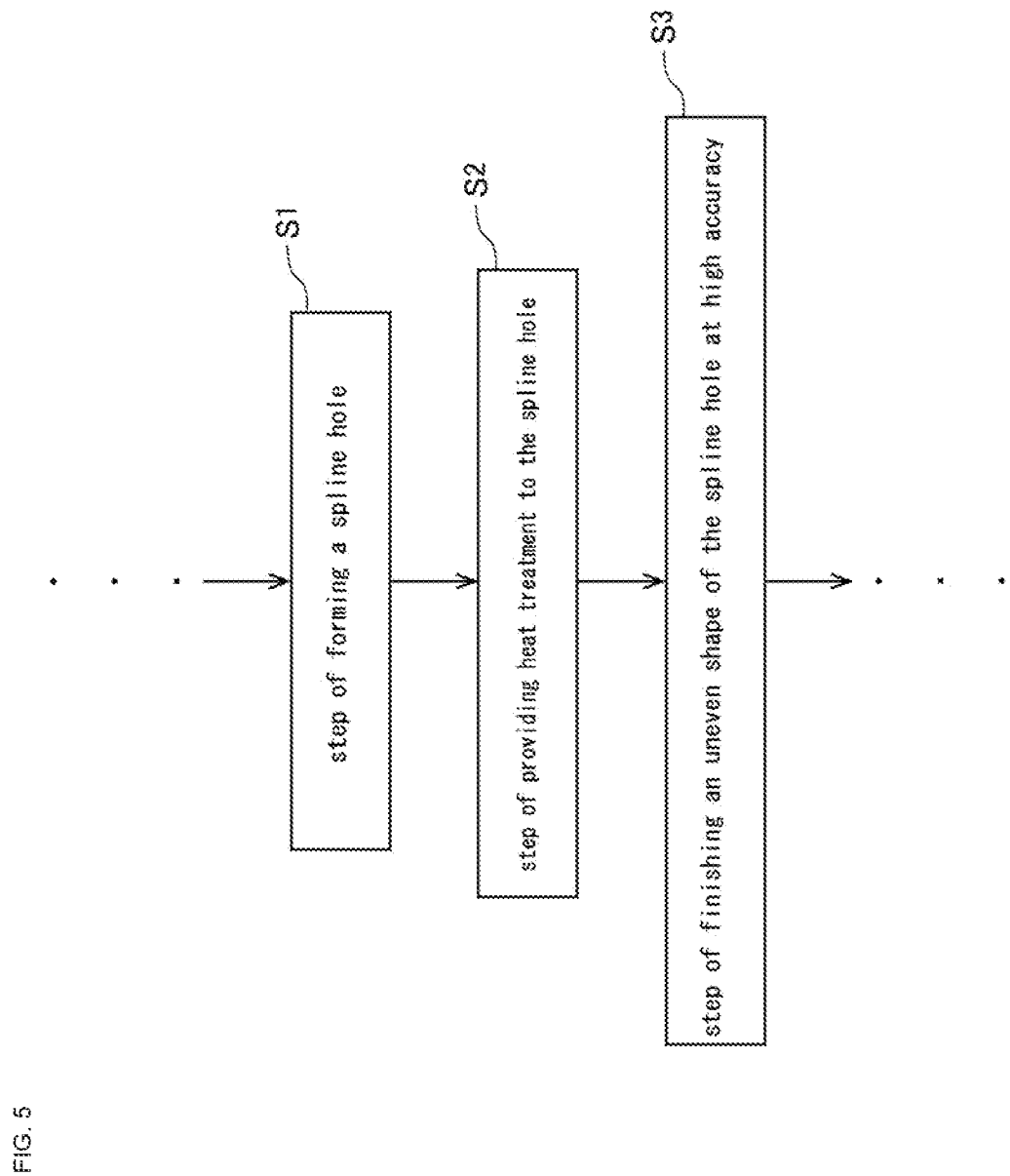
FIG. 5 shows a step of manufacturing a hub race.

Next, a step of manufacturing the hub race 31 will be described. FIG. 5 shows the step of manufacturing the hub race 31. Here, the description will focus on a part of the step related to the invention of this application.

In step S1, the spline hole 3b is formed (forming step). More specifically, the hub race 31 includes a through hole 3h at a center of the hub race 31, and in step S1, the spline hole 3b is formed by running a broach 7 through the through hole 3h (see FIG. 6). Note that, in this description, the broach 7 used in step S1 is defined as a "forming broach 7".

In step S2, the spline hole 3b is subjected to heat treatment. In step S2, in addition to the spline hole 3b, the outer raceway faces 2c and 2d as well as the inner raceway faces 3c and 3d are subjected to the heat treatment. More specifically, in step S2, a coil body is inserted into the spline hole 3b to generate an electric current flow through the spline hole 3b, and an eddy current induces heat. As a result, the heat treatment is provided to the spline hole 3b. Note that, a hardened layer depth has a wave-shape change in accordance with the uneven shape of the spline hole 3b (see an area hatched in each of FIGS. 7 and 9). The heat treatment is not required of a phase matching portion 3S as will be described later.

In step S3, the uneven shape of the spline hole 3*b* is finished at high accuracy (finishing step). More specifically, the uneven shape of the spline hole 3*b* still has a cutting allowance, and the cutting allowance is removed by running a broach 8 through the spline hole 3*b*. As a result, the uneven shape of the spline hole 3*b* is finished at high accuracy (see FIG. 8). Note that, in this description, the broach 8 used in step S3 is defined as a "finishing broach 8".

Figure 6:
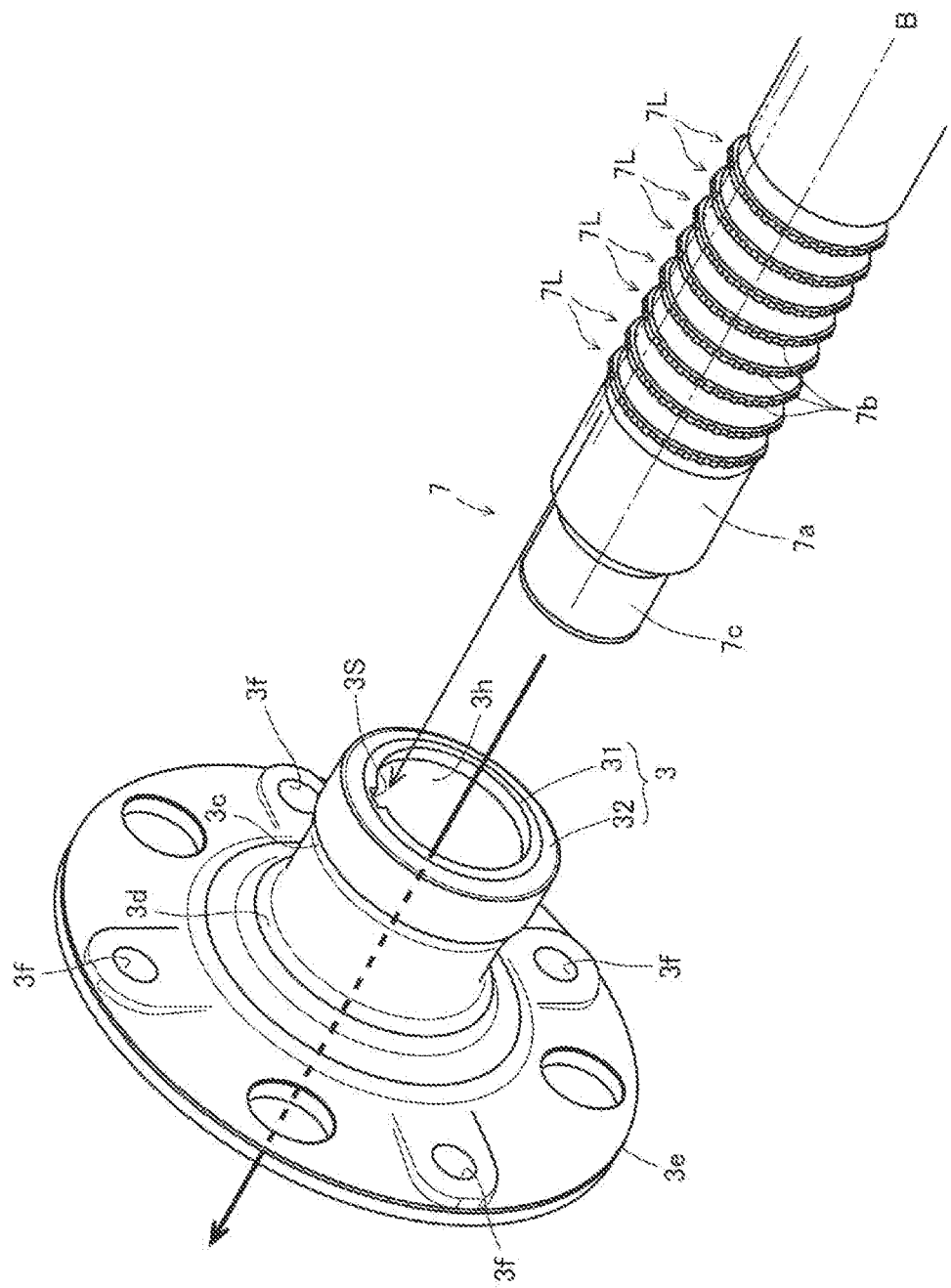
FIG. 6 illustrates a step of forming a spline hole.
Figure 7:
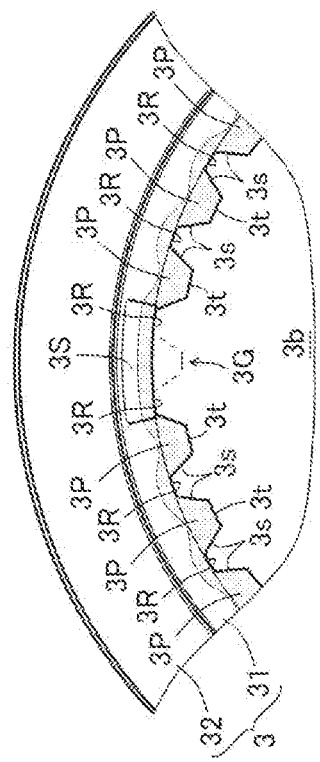
FIG. 7 illustrates a guide groove formed on an inner circumference of the spline hole.

Next, the step of forming the spline hole 3*b* (forming step) will be described in detail. FIG. 6 illustrates the step of forming the spline hole 3*b*. FIG. 7 illustrates a guide groove 3G formed on an inner circumference of the spline hole 3*b*.

First, the forming broach 7 will be described. The forming broach 7 includes a shaft body 7*a*, and a plurality of cutting blades 7*b*, each of which is disposed around the shaft body 7*a*. More specifically, the forming broach 7 includes a cutting blade row 7L that is formed of the plurality of cutting blades 7*b* disposed in a circumferential direction of the shaft body 7*a*. The cutting blade row 7L is axially provided at multiple stages. The forming broach 7 also includes, at its tip, a grip 7*c*. Then, the grip 7*c* is gripped and pulled by a broaching machine so that the forming broach 7 is run through the through hole 3*h*.

With this configuration, the forming broach 7 is run through the through hole 3*h* of the hub race 31 to cause each of the cutting blades 7*b* to gradually shave off an inner circumferential face of the through hole 3*h*. As a result, the spline hole 3*b* is formed. The spline hole 3*b* formed has the uneven shape where each of recesses 3R (that form the uneven shape) has a side face 3*s* formed in an involute curve shape. In other words, each of projections 3P (that form the uneven shape) has the side face 3*s* formed in the involute curve shape.

In the forming broach 7, each of the cutting blades 7*b* of the cutting blade rows 7L is designed to be circumferentially large. The cutting blades 7*b*, each circumferentially large, are disposed in a row along a central axis B (see a two-dot chain line in FIG. 6). An object of this configuration is to form the spline hole 3*b*, and concurrently to form the guide groove 3G that is large in width. Note that, the guide groove 3G is not formed in the projections 3P of the uneven shape. The guide groove 3G is a part where the recesses 3R on both sides of the projections 3P are circumferentially connected to each other. In other words, the guide groove 3G is formed of the plurality of recesses 3R that are adjacent to each other and are circumferentially connected to each other. The guide groove 3G included in the hub race 31 according to this application is formed of two of the recesses 3R that are adjacent to each other and are circumferentially connected to each other.

As has been described above, the guide groove 3G is formed of the two of the recesses 3R adjacent to each other in order to facilitate a guide plate 8G (to be described later) to be fitted into the guide groove 3G. Additionally, this configuration is most appropriate in terms of rigidity and strength. Here, the guide groove 3G may be formed of one of the recesses 3R; however, in this case, the guide plate 8G is less prone to be fitted into the guide groove 3G. The guide groove 3G may also be formed of three or more of the recesses 3R; however, in this case, the rigidity and the strength of the guide groove 3G are degraded. Accordingly, the configuration with which the guide groove 3G is formed of the two of the recesses 3R adjacent to each other is considered as a technical feature.

Figure 8:
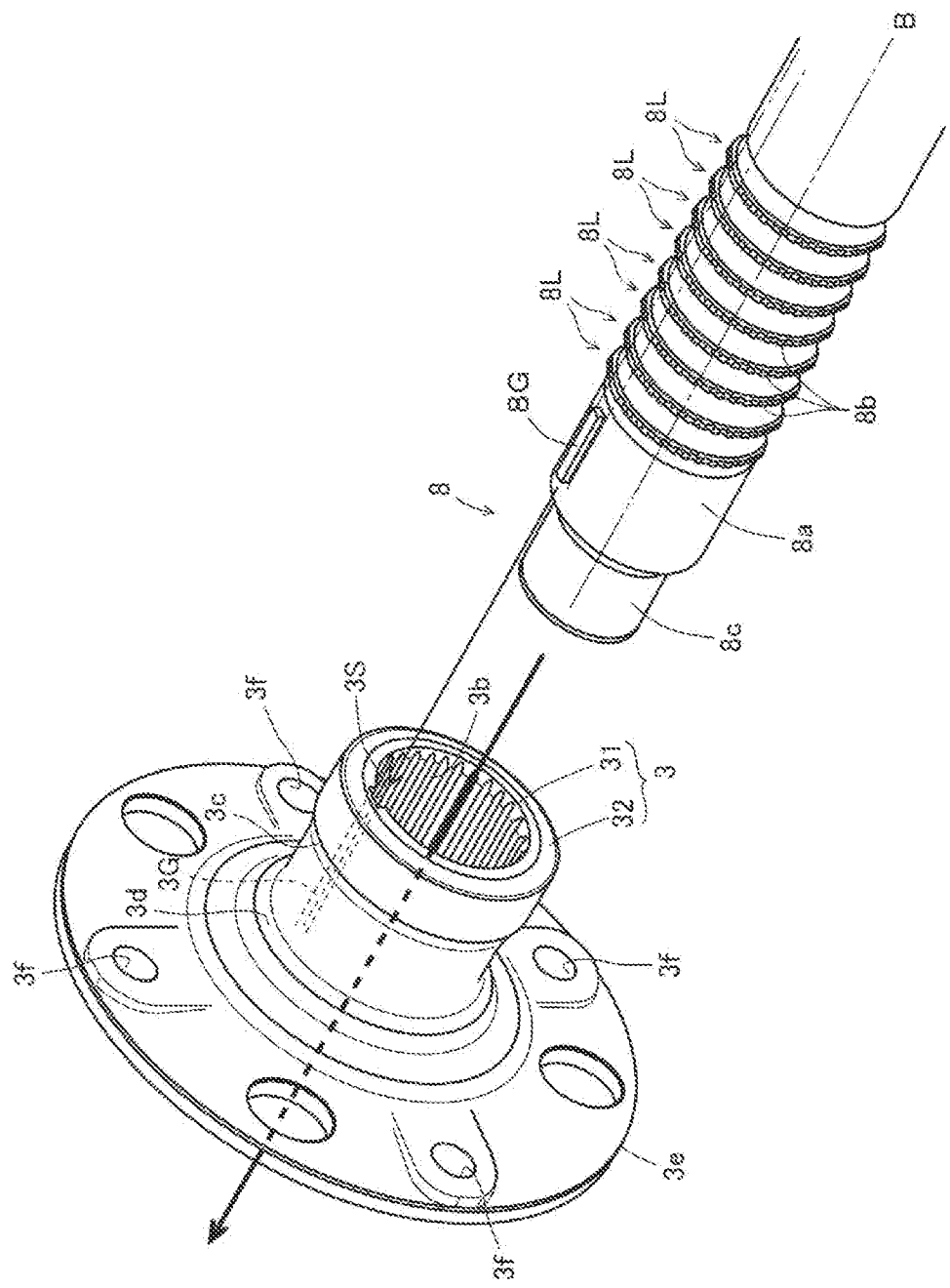
FIG. 8 illustrates a step of finishing an uneven shape of the spline hole at high accuracy.

Next, the step of finishing the uneven shape of the spline hole 3*b* at high accuracy (finishing step) will be described in detail. FIG. 8 illustrates the step of finishing the uneven shape of the spline hole 3*b* at high accuracy. FIG. 9(A) illustrates a cutting allowance T including a side face 3*s* to be removed by the finishing broach 8. FIG. 9(B) illustrates the cutting allowance T including a side face 3*s* and an upper face 3*t* to be removed by the finishing broach 8.

First, the finishing broach 8 will be described. The finishing broach 8 includes a shaft body 8*a*, and a plurality of cutting blades 8*b*, each of which is disposed around the shaft body 8*a*. More specifically, the finishing broach 8 includes a cutting blade row 8L that is formed of the plurality of cutting blades 8*b* disposed in a circumferential direction of the shaft body 8*a*. The cutting blade row 8L is axially provided at multiple stages. The finishing broach 8 also includes, at its tip, a grip 8*c*. Then, the grip 8*c* is gripped and pulled by a broaching machine so that the finishing broach 8 is run through the spline hole 3*b*.

With this configuration, the finishing broach 8 is run through the spline hole 3*b* of the hub race 31 to cause each of the cutting blades 8*b* to gradually shave off the uneven shape of the spline hole 3*b*. As a result, the uneven shape of the spline hole 3*b* is finished at high accuracy. The spline hole 3*b* finished also has the uneven shape where each of the recesses 3R (that form the uneven shape) has a side face 3*s* formed in an involute curve shape. In other words, each of projections 3P (that form the uneven shape) has the side face 3*s* formed in the involute curve shape.

In the finishing broach 8, each of the cutting blades 8*b* of the cutting blade rows 8L is designed to be circumferentially large. The cutting blades 8*b*, each circumferentially large, are disposed in a row along the central axis B (see a two-dot chain line in FIG. 8). An object of this configuration is to finish the uneven shape of the spline hole 3*b* at high accuracy, and concurrently to form the guide groove 3G that is large in width at high accuracy. Further, the finishing broach 8 includes the guide plate 8G that is formed on an outer circumference of a tip of the shaft body 8*a* and protruded radially outward. The guide plate 8G has a cuboid shape, the lengthwise direction of which extends along the central axis B. The guide plate 8G fits into the guide groove 3G when the finishing broach 8 is run through the spline hole 3*b*.

As has been described above, in the wheel bearing device 1 according to this application, the guide groove 3G is formed on the inner circumference of the spline hole 3*b*, and the guide plate 8G of the finishing broach 8 is run through the guide groove 3G. With this configuration, it is possible to easily match a phase of the finishing broach 8 to the uneven shape of the spline hole 3*b*. Then, as illustrated in FIG. 9(A), the finishing broach 8 shaves off the side face 3*s* of each of the projections 3P forming the uneven shape. Further, as illustrated in FIG. 9(B), in addition to the side face 3*s* of each of the projections 3P forming the uneven shape, the finishing broach 8 may shave off an upper face 3*t* of the corresponding projection 3P. Here, a drill may be additionally used to shave off the upper face 3*t* of the corresponding projection 3P. The cutting allowance T is appropriately 0.2 mm to 0.3 mm.

Figure 10:
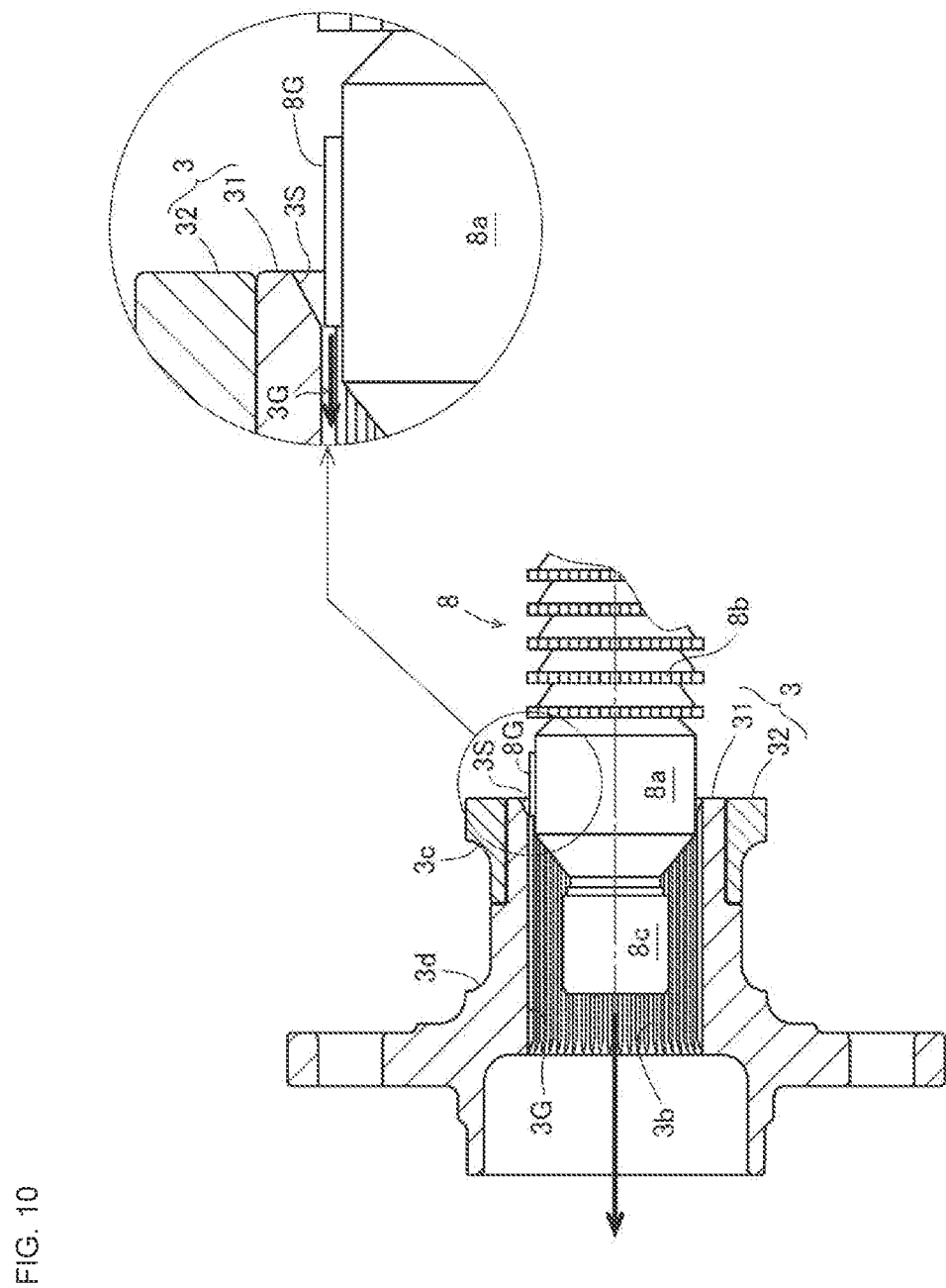
FIG. 10 illustrates a state where a guide plate goes into the guide groove.
Figure 11:
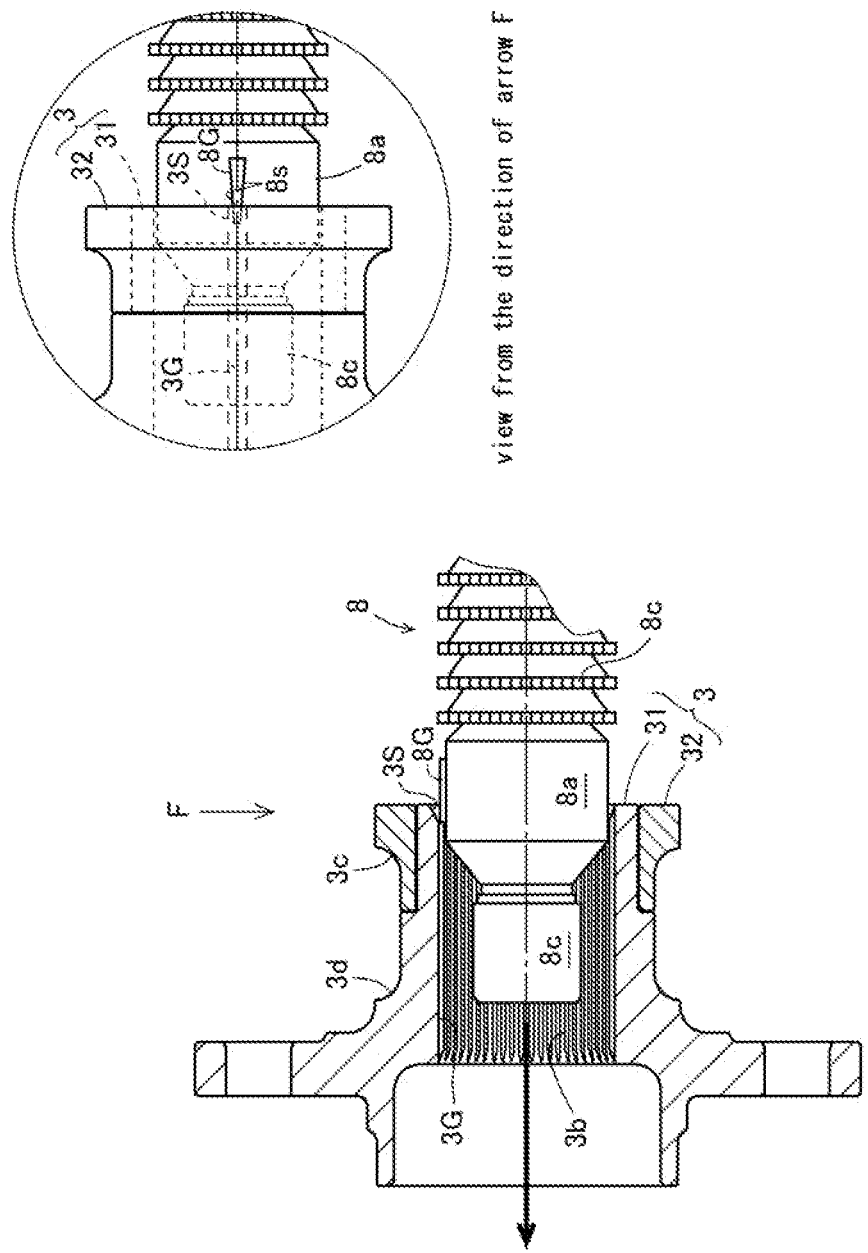
FIG. 11 illustrates a state where a guide plate according to other embodiment goes into the guide groove.

Next, other features of the wheel bearing device 1 according to this application will be described. FIG. 10 illustrates a state where the guide plate 8G goes into the guide groove 3G. FIG. 11 illustrates a state where a guide plate 8G goes into a guide groove 3G, both according to other embodiment.

In the wheel bearing device 1 according to this application, the phase matching portion 3S is formed on an inner-side end face of the hub race 31 and recessed at the outer side. The phase matching portion 3S is equal in width to the guide groove 3G, and gradually spreads radially outward as closer to the inner side (see FIG. 10). In other words, the phase matching portion 3S is formed in a shape where an inner-side opening end of the guide groove 3G spreads radially outward. This configuration causes an operator to grasp a position of the guide groove 3G at a glance without looking into the spline hole 3b. Further, the guide plate 8G goes into the guide groove 3G in accordance with an inclination of the phase matching portion 3S, and thus a step of fitting the guide plate 8G into the guide groove 3G is easily performed.

In a step of manufacturing the wheel bearing device 1 according to this application, the step of fitting the guide plate 8G of the finishing broach 8 into the guide groove 3G is important. In order to smoothly perform the step, the guide plate 8G may be formed in a wedge shape. In other words, the guide plate 8G may have a cross-sectional face 8s formed to be inclined toward the side face 3s of the guide groove 3G. With this configuration, as the guide plate 8G goes into the guide groove 3G, a gap between the cross-sectional face 8s of the guide plate 8G and the side face 3s of the guide groove 3G is gradually reduced (see FIG. 11). As a result, the guide plate 8G goes into the guide groove 3G in accordance with the inclination of the cross-sectional face 8s, and thus the step of fitting the guide plate 8G into the guide groove 3G is easily performed. In this regard, the phase matching portion 3S may be formed to gradually spread radially as closer to the inner side. Even with this configuration, the guide plate 8G goes into the guide groove 3G in accordance with the inclination of a side face of the phase matching portion 3S, and thus the step of fitting the guide plate 8G into the guide groove 3G is easily performed.

Figure 12:
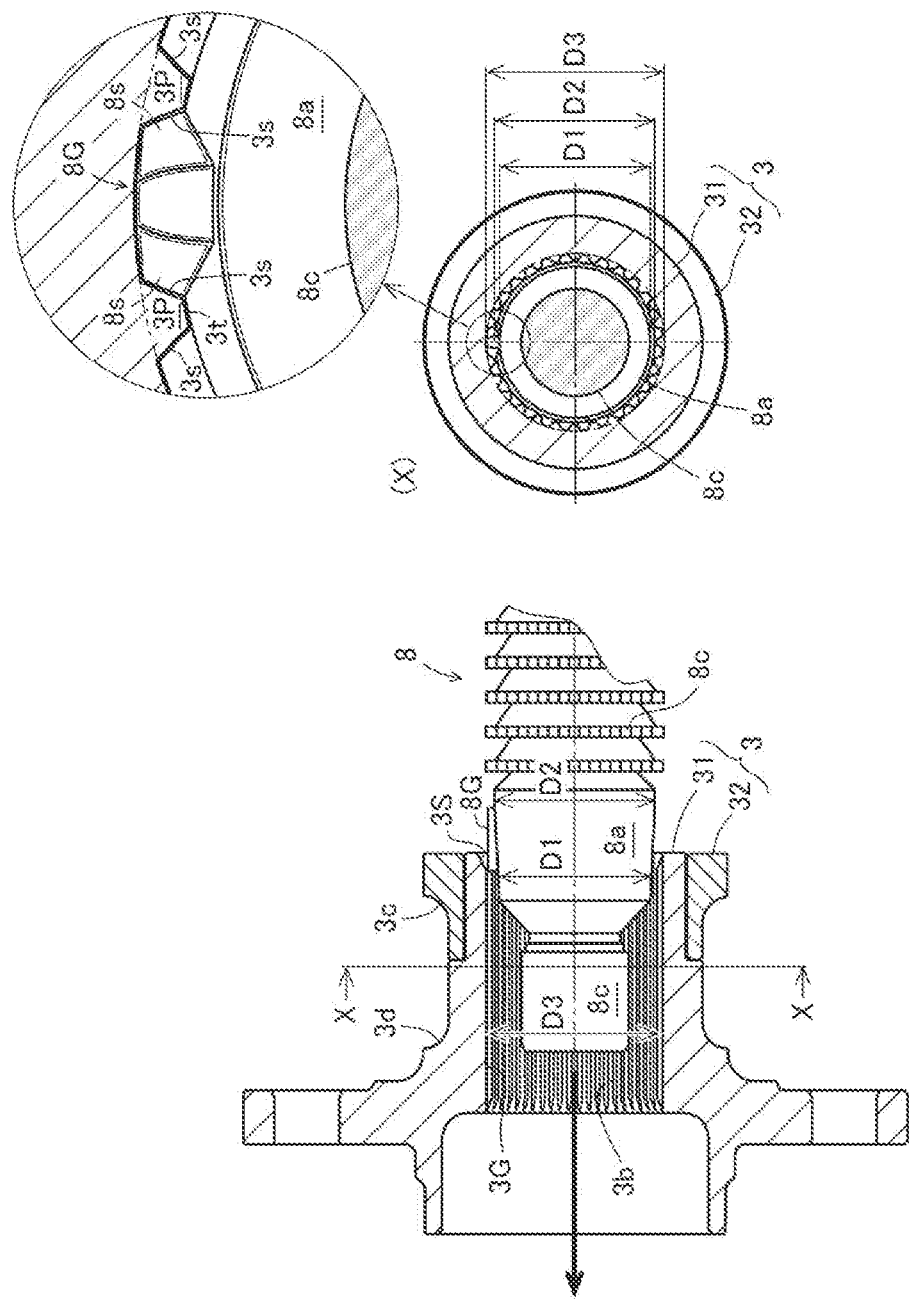
FIG. 12 illustrates the finishing broach including a shaft body, the tip of which is formed in a tapered shape.

Next, a finishing broach 8 according to the other embodiment will be described. FIG. 12 illustrates the finishing broach 8 including a shaft body 8a, the tip of which is formed in a tapered shape. Note that, FIG. 12(X) is a sectional view taken along line X-X.

As illustrated in FIG. 12, in the finishing broach 8 according to this embodiment, the tip of the shaft body 8a has its outer diameter gradually increasing. Accordingly, when D1 represents the outer diameter at a front end of the tip of the shaft body 8a, and D2 represents the outer diameter at a rear end of the tip of the shaft body 8a, a relationship between D1 and D2 is expressed by Mathematical Formula A below. Further, when D3 represents a large diameter of each of the guide groove 3G and a recess 3R (diameter of a circle formed by connecting the guide groove 3G and a bottom face of the recess 3R), a relationship among D1, D2, and D3 is expressed by Mathematical Formula B below. Note that, when the tip of the shaft body 8a has the tapered shape, a cross-sectional face 8s of the guide plate 8G gradually narrows from its front end and eventually merges into a side face 3s of a projection 3P. With this configuration, the step of fitting the guide plate 8G of the finishing broach 8 into the guide groove 3G is performed more smoothly, and the phase of the finishing broach 8 is more precisely matched. This configuration also controls eccentricity of the finishing broach 8.

$$D1 < D2 \quad \text{Mathematical Formula A:}$$

$$D2 \leq (D1+D2)/2 \leq D3 \quad \text{Mathematical Formula B:}$$

Figure 13:
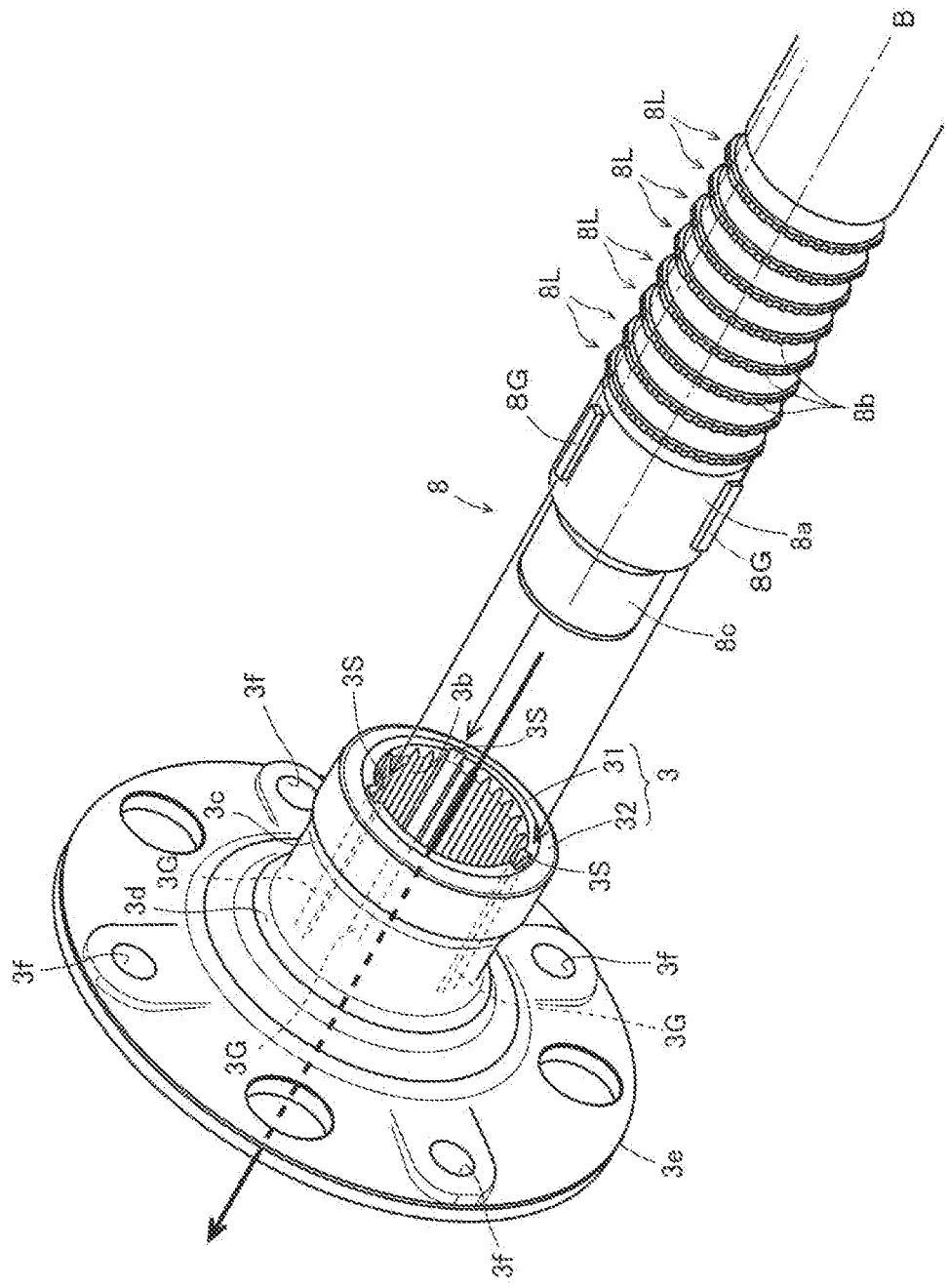
FIG. 13 illustrates the hub race where a plurality of guide grooves are formed, and the finishing broach where a plurality of guide plates are provided.

Next, a hub race 31 and the finishing broach 8, both according to the other embodiment, will be described. FIG. 13 illustrates the hub race 31 where a plurality of guide grooves 3G are formed, and the finishing broach 8 where a plurality of guide plates 8G are provided.

As illustrated in FIG. 13, in the hub race 31 according to this embodiment, the plurality of guide grooves 3G are spaced evenly on an inner circumference of a spline hole 3b. Each of the guide grooves 3G axially extends from three phase matching portions 3S that are similarly spaced evenly. Concurrently, in the finishing broach 8 according to this embodiment, the plurality of guide plates 8G are spaced evenly on an outer circumference of the tip of the shaft body 8a. Each of the guide plates 8G has a cuboid shape, the lengthwise direction of which extends along the central axis B, or has a wedge shape. Each of the guide plates 8G fits into the corresponding guide groove 3G when the finishing broach 8 is run through the spline hole 3b. With this configuration, a phase of the finishing broach 8 is more precisely matched. This configuration also controls eccentricity of the finishing broach 8.

The invention of this application and advantageous effects thereof will be summarized below.

In a wheel bearing device 1 according to this application, a spline hole 3b has a guide groove 3G that is formed on an inner circumference of the spline hole 3b, and a guide plate 8G of a finishing broach 8 is run through the guide groove 3G. In the wheel bearing device 1, a phase of the finishing broach 8 is easily matched to an uneven shape of the spline hole 3b. Additionally, it is possible to finish the uneven shape of the spline hole 3b at high accuracy by securing an appropriate cutting allowance T. Further, it is possible to protect a broached surface of the spline hole 3b from being roughened, and to prevent the finishing broach 8 from being overloaded and reduced in service life.

In the wheel bearing device 1 according to this application, the guide groove 3G is formed of a plurality of recesses 3R that are adjacent to each other and are circumferentially connected to each other. The plurality of recesses 3R are a part of the recesses 3R that form the uneven shape. In the wheel bearing device 1, when the spline hole 3b is formed by running a forming broach 7, the guide groove 3G is concurrently formed. This configuration simplifies a step of manufacturing the wheel bearing device. As a result, it is possible to suppress an increase of cost.

In the wheel bearing device 1 according to this application, a phase matching portion 3S is formed in a shape where an inner-side opening end of the guide groove 3G spreads radially outward. In the wheel bearing device 1, an operator grasps a position of the guide groove 3G at a glance, and thus a step of fitting the guide plate 8G of the finishing broach 8 into the guide groove 3G is easily performed.

Further, in the wheel bearing device 1 according to this application, the guide plate 8G has a cross-sectional face 8s formed to be inclined toward a side face 3s of the guide groove 3G. With this configuration, as the guide plate 8G goes into the guide groove 3G, a gap between the cross-sectional face 8s of the guide plate 8G and the side face 3s of the guide groove 3G is gradually reduced. In the wheel bearing device 1, the guide plate 8G goes into the guide groove 3G in accordance with an inclination of the cross-sectional face, and the phase of the finishing broach 8 is thereby tuned.

Additionally, in a method for manufacturing the wheel bearing device 1 according to this application, a finishing step includes a step of fitting the guide plate 8G of the finishing broach 8 into the guide groove 3G that is formed on the inner circumference of the spline hole 3b. In the method for manufacturing the wheel bearing device 1, the phase of the finishing broach 8 is easily matched to the uneven shape of the spline hole 3b. Additionally, it is possible to finish the uneven shape of the spline hole 3b at high accuracy by securing an appropriate cutting allowance T. Further, it is possible to protect a broached surface of the spline hole 3b from being roughened, and to prevent the finishing broach 8 from being overloaded and reduced in service life.

The wheel bearing device 1 according to this application has a typically called third generation structure formed of an outer member 2 and an inner member 3, the outer member 2 including a knuckle flange 2e and the inner member 3 including a hub race 31 and an inner race 32 fitted to the hub race 31; however, the present invention is not limited thereto. For example, the wheel bearing device 1 may have a second generation structure formed of an outer member and an inner member, the outer member including a knuckle flange and the inner member formed of a pair of inner races; and the inner member is fitted to an outer circumference of a hub race. Alternatively, the wheel bearing device 1 may have a fourth generation structure formed of an outer member and an inner member, the outer member including a knuckle flange and the inner member as an assembly where a hub race and a universal joint are fitted to each other.

Lastly, it is to be understood that the foregoing embodiments are merely illustrative, and not restrictive, of the invention according to this application; therefore, various changes and modifications may be made without departing from the scope of the present invention. The scope of the present invention is defined by the appended claims and is intended to embrace all changes and modifications within the meanings and scopes equivalent to the claims.

REFERENCE SIGNS LIST 1 wheel bearing device
2 outer member
2c outer raceway face
2d outer raceway face
3 inner member
31 hub race
32 inner race
3b spline hole
3c inner raceway face
3d inner raceway face
3h through hole
3G guide groove
3R recess
3P projection
3s side face
3t upper face
4 rolling element row
41 rolling element
42 retainer
7 forming broach
8 finishing broach
8G guide plate
8s cross-sectional face

The invention claimed is:

1. A wheel bearing device comprising: an outer member including an outer raceway face that is formed on an inner circumference of the outer member; an inner member including an inner raceway face that is formed on an outer circumference of the inner member; and a plurality of rolling elements that are interposed between the outer raceway face of the outer member and the inner raceway face of the inner member, the wheel bearing device further comprising a spline hole that is formed in a through hole of the inner member, wherein the spline hole includes a plurality of projections and a plurality of recesses, and a guide groove that is formed on an inner circumference of the spline hole, the guide groove through which a guide plate of a finishing broach is to be run, wherein the guide groove is formed by removing a projection, of the plurality of projections, between two adjacent recesses of the plurality of recesses, wherein a hardened layer and a non-hardened layer are formed in side surfaces of the guide groove, wherein a depth of the hardened layer changes such that the hardened layer has a wave-shape, wherein the hardened layer is a single layer, and wherein in a cross-section as viewed in an axial direction of the inner member, the hardened layer is formed over an entire depth of each projection of the plurality of projections, wherein the side surfaces of the guide groove include side surfaces of two projections of the plurality of projections, respectively, and are inclined relative to a radially outermost surface of the guide groove, wherein side surfaces of the guide plate are inclined along the side surfaces of the guide groove, wherein the guide groove is formed of the two adjacent recesses, of the plurality of recesses, that are circumferentially connected to each other, the plurality of recesses forming an uneven shape, and wherein a radial depth of the guide groove is the same as a radial depth of each of the plurality of recesses.

2. The wheel bearing device according to claim 1, wherein the inner member includes a phase matching portion that is formed on an inner-side end face of the inner member and recessed at an outer side of the inner member, and the phase matching portion is formed in a shape where an inner-side opening end of the guide groove spreads radially outward.

3. The wheel bearing device according to claim 1, wherein the guide plate includes a cross-sectional face that is formed to be inclined toward a side face of the guide groove, and as the guide plate goes into the guide groove, a gap between the cross-sectional face of the guide plate and the side face of the guide groove is gradually reduced.

* * * * *